(12) United States Patent
Cabuz et al.

(10) Patent No.: US 7,546,772 B2
(45) Date of Patent: Jun. 16, 2009

(54) PIEZORESISTIVE PRESSURE SENSOR

(75) Inventors: Eugen I Cabuz, Edina, MN (US);
Cleopatra Cabuz, Edina, MN (US);
Tzu-Yu Wang, Maple Grove, MN (US)

(73) Assignee: Honeywell International Inc., Morristown, NJ (US)

( * ) Notice: Subject to any disclaimer, the term of this patent is extended or adjusted under 35 U.S.C. 154(b) by 529 days.

(21) Appl. No.: 11/027,287

(22) Filed: Dec. 30, 2004

(65) Prior Publication Data

US 2006/0144152 A1 Jul. 6, 2006

(51) Int. Cl.
*G01L 7/08* (2006.01)

(52) U.S. Cl. .............................. 73/715; 73/721; 73/723; 73/727; 361/283.1

(58) Field of Classification Search ........... 73/700–756; 361/283.1–283.4
See application file for complete search history.

(56) References Cited

U.S. PATENT DOCUMENTS

| | | | | |
|---|---|---|---|---|
| 3,745,506 A * | 7/1973 | Bethe | | 338/22 SD |
| 4,287,553 A * | 9/1981 | Braunlich | | 361/283.4 |
| 4,966,039 A * | 10/1990 | Dell'Acqua | | 73/727 |
| 5,417,115 A * | 5/1995 | Burns | | 73/778 |
| 5,485,753 A * | 1/1996 | Burns et al. | | 73/720 |
| 6,076,409 A * | 6/2000 | Bang | | 73/756 |
| 6,300,169 B1 * | 10/2001 | Weiblen et al. | | 438/127 |
| 6,359,458 B1 * | 3/2002 | Yoshii | | 324/765 |
| 6,575,020 B1 * | 6/2003 | de Charmoy Grey et al. | | 73/54.23 |
| 6,580,574 B1 | 6/2003 | Codilian | | |
| 6,640,650 B2 * | 11/2003 | Matsuzawa et al. | | 73/861.47 |
| 6,767,190 B2 | 7/2004 | Cabuz et al. | | |
| 6,986,649 B2 * | 1/2006 | Dai et al. | | 417/413.2 |
| 2003/0089182 A1 * | 5/2003 | Thaysen et al. | | 73/862.621 |
| 2004/0134283 A1 | 7/2004 | Lewis | | |
| 2004/0202548 A1 | 10/2004 | Dai et al. | | |
| 2005/0021247 A1 * | 1/2005 | Liu et al. | | 702/42 |

FOREIGN PATENT DOCUMENTS

FR 2667395 A1 * 4/1992

* cited by examiner

*Primary Examiner*—Andre J Allen
*Assistant Examiner*—Jermaine Jenkins
(74) *Attorney, Agent, or Firm*—Kris T. Fredrick

(57) ABSTRACT

A pressure sensor includes a housing portion with a fluid inlet and a polymer element within the housing portion. The polymer element may be coated with piezoresistive material to form a first resistor and may have associated electrodes. The polymer element includes a first resistance value that changes to a second resistive value in a response to a predetermined condition. The pressure sensor may also include a second polymer element that includes a first resistance value that changes to a second resistive value in a response to a predetermined condition.

27 Claims, 5 Drawing Sheets

Bridge configuration

PIEZORESISTIVE PRESSURE SENSOR

FIELD

This application relates in general to a piezoresistive pressure sensor.

BACKGROUND

Some industrial, commercial, medical, aerospace and military systems depend on reliable pressure sensors for fluid (including gas) handling. Pressure transducers that use piezoresistors may be formed with a silicon substrate and an epitaxial layer, which is grown on the substrate. A portion of the substrate is removed, leaving a thin, flexible diaphragm. The piezoresistors are located in the diaphragm to form a pressure transducer.

In operation, at least one surface of the diaphragm is exposed to a process pressure. The diaphragm deflects according to the magnitude of the pressure, and this deflection bends the attached piezoresistors. Bending of the diaphragm may create a change in the resistance value of the piezoresistors. The change in the resistive value may be reflected as a change in the output voltage signal of a resistive bridge formed at least partially by the piezoresistors. The silicon-based sensors and actuators may have limitation in versatility and may be relatively costly.

BRIEF DESCRIPTION OF THE DRAWINGS

In the figures, like reference characters designate identical or corresponding components and units throughout the several views.

DETAILED DESCRIPTION

In embodiments herein, pressure within a fluid chamber of a pressure sensor changes as the pressure of the monitored fluid changes. The polymer diaphragm within the fluid chamber may move, deflect and/or deform as a result of the change in pressure within the fluid chamber. When the diaphragm moves, a variation in resistance of a piezoresistor of the diaphragm may be induced. The electrode outputs coupled to electrodes of the diaphragm may cause a control system to read the change in resistance. The variation in resistance may be proportional to the applied pressure, and therefore, the applied pressure may be measured.

Figure 1A:
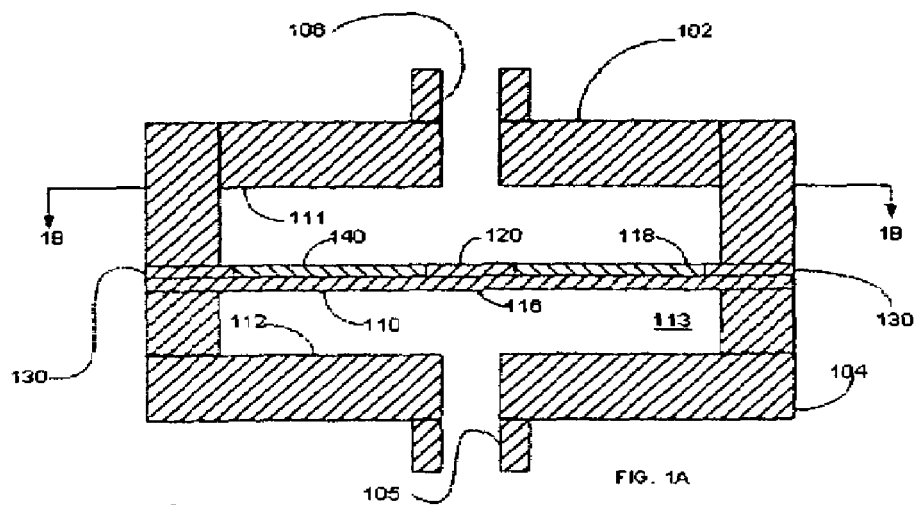
FIG. 1A illustrates a cross-sectional side view of a pressure sensor according to an example embodiment.
Figure 1B:
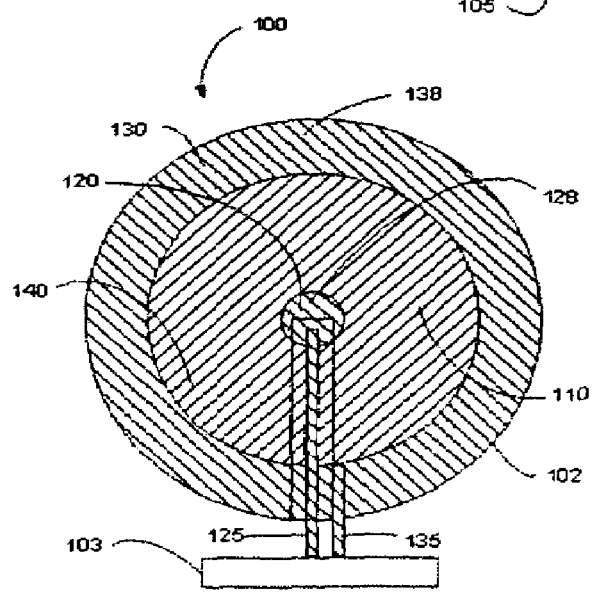
FIG. 1B illustrates a plan view of a diaphragm of the pressure sensor of FIG. 1A taken through 1B-1B.

FIGS. 1A and 1B illustrate a cross-sectional side view and a plan view of a system 100 including a pressure sensor 102 and a control system 103, according to an example embodiment. The pressure sensor 102 includes a housing 104, a fluid inlet 105 of the housing, a vent 106 or fluid outlet port of the housing, and a diaphragm 110 within the housing. The pressure sensor 102 may use the diaphragm 110 to measure a pressure of a fluid introduced in the fluid inlet, as described in more detail below.

The housing 104 may be made from any suitable semi-rigid or rigid material, such as plastic, ceramic, silicon, etc. However, the housing may be constructed by molding a high temperature plastic such as ULTEM™ (available from General Electric Company, Pittsfield, Mass.), CELAZOLE™ (available from Hoechst-Celanese Corporation, Summit, N.J.), KETRON™ (available from Polymer Corporation, Reading, Pa.), or some other suitable plastic material.

The housing 104 includes a first inner wall 111 and a second inner wall 112. For purposes of illustration, the first and second inner walls 111, 112 are shown to be generally flat. However, the walls may assume other shapes, depending upon the application. For example, the second inner wall 112 may have different regions that are recessed or protrude against the diaphragm 110 in order to, for example, prevent the diaphragm 110 from achieving a suction lock against the second inner wall 112. Other shapes may be used for the inner walls, depending on the application.

The first inner wall 111 and the second inner wall 112 form a fluid chamber 113 within the housing. The pressure within the fluid chamber 113 may change as the pressure of the monitored fluid from the fluid inlet 105 changes. The diaphragm 110 may proportionally deflect as a result of the change in pressure within the fluid chamber 113, as described in more detail below. The polymer element or diaphragm 110 may deflect from a stored position to an active position upon applied pressure into the fluid inlet. The polymer element 110 may return to the stored position upon a release of the applied pressure.

The diaphragm 110 is contained within the housing in the illustrated embodiment. The diaphragm 110 has a first surface 116 facing the second inner wall 112 and a second surface 118 facing the first inner wall 111 of the housing.

The diaphragm 110 may be considered a polymer element. The diaphragm may be made of a material or form, or disposed in a fashion, such that the diaphragm, once deformed, generates a restoring force that pulls the diaphragm back towards the second inner wall 112. The diaphragm 110 may be made from any suitable material, having elastic, resilient, flexible or other elastomeric property. The diaphragm 110 may be a substrate that is made from a polymer such as KAPTON™ (available from E. I. du Pont de Nemours & Co., Wilmington, Del.), KALADEX™ (available from ICI Films, Wilmington, Del.), MYLAR™ (available from E. I. du Pont de Nemours & Co., Wilmington, Del.), or any other suitable material. With a polymer-based substrate, the pressure sensor may be made inexpensively, may be light weight, and/or suitable for small handheld applications, or even suitable for disposable or reusable applications.

The polymer substrate of the diaphragm may include a predetermined pre-stress amount. When the stress in the polymer substrate is relatively low, the diaphragm may be substantially soft. When the pre-stress in the polymer substrate is relatively high, the diaphragm may be substantially rigid. The pre-stress on the substrate may depend on a thickness of substrate, a geometry of the substrate, a material of the substrate, and depending upon the application for which the substrate is used.

In an embodiment, the piezoresistive element and the substrate are polymer based. The polymer-based substrate and piezoresistive element may share a generally equivalent coefficient of thermal expansion, thereby substantially preventing stress from occurring between the substrate and the piezoresistive element(s) based on thermal expansion.

The housing 104 includes the fluid inlet 105 along the second inner wall 112, and the vent 106 along the first inner wall 111. The vent 106 may be configured for atmospheric pressure, a reference pressure, back pressure or a vacuum pressure. Supplemental restoring forces to the diaphragm may be created by applying back pressure through the vent 106. The pressure in the pressure sensor may include a difference between an inlet pressure at the fluid inlet 105 of the pressure sensor and a reference pressure at the vent 106 of the pressure sensor.

The diaphragm 110 may be on a plane that is perpendicular to the fluid inlet 105, and substantially parallel to the second inner wall 112, as shown in FIG. 1A. The diaphragm 110 may be positioned near a middle of the chamber 113. The diaphragm may be substantially straight when in a stored position, and deflected in an active position.

Disposed along the second surface 118 of the diaphragm may be a first electrode 120 and a second electrode 130. The first electrode 120 and the second electrode 130 may extend from the pressure sensor 102 as output connections 125, 135, respectively, to couple with the control system 103. The first electrode 120 may be along a central region 128 of the diaphragm, and the second electrode 130 may be along an edge region 138 of the diaphragm. The electrodes 120 and 130 may be formed of aluminum thickly deposited upon the diaphragm. The control system 103 may also include a ground (not shown) that may ground the pressure sensor with the control system.

Piezoresistive material may be disposed along the second surface 118 of the diaphragm, in between the first electrode 120 and the second electrode 130. The piezoresistive material forms a resistor 140 on the diaphragm. The electrodes 120, 130 and the resistor 140 of the diaphragm may be disposed along the first surface 116 of the diaphragm. A protective coating (not shown), such as a dielectric or a polymer, may be applied over the electrode(s) and/or resistor(s) in each embodiment disclosed herein.

Figure 1C:
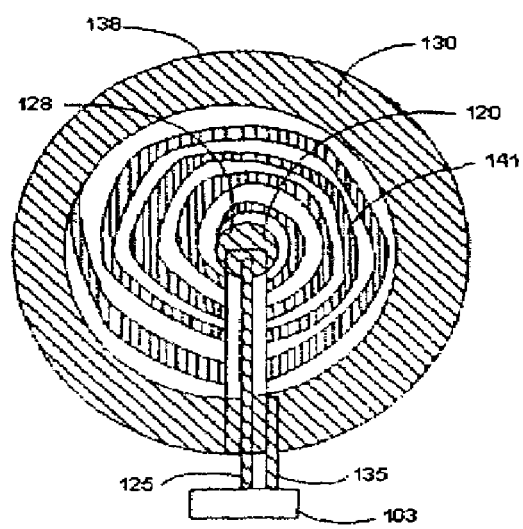
FIG. 1C illustrates a plan view of another diaphragm of the pressure sensor of FIG. 1A taken through 1B-1B.

As shown in FIG. 1B, the piezoresistive material is deposited radially on the polymer diaphragm. In an embodiment not shown, the piezoresistive material does not cover the entire substrate surface from the central region 128 to the edge region 138. In an additional embodiment, the piezoresistive material is deposited as a piezoresistor 141 in a spiral pattern, as shown in the plan view of FIG. 1C, or may be deposited about the substrate in various patterns, such as variable radial widths.

The piezoresistive material may be thicker and/or wider near the central region of the substrate as compared with the edge region, depending upon the application. In this embodiment, the thinner portion of piezoresistive material may act as a stress concentration point within the overall diaphragm structure, whereby any stress deformation within the diaphragm is mostly experienced at the thinner portion.

The piezoresistive material may include an organic material. The piezoresistive material may include a polymer. The piezoresistive material may be coated as a film on the diaphragm and/or element of the illustrated embodiments. The pressure sensor device may have large sensitivity due to large displacement of the diaphragm and/or element coated with the piezoresistive film.

The diaphragm includes a first resistance value that changes to a second resistive value in a response to a predetermined condition. The predetermined condition may include the polymer substrate under applied pressure to deflect. The predetermined condition may also include a change in an environmental condition. The resistive values may be associated with at least one piezoresistor of the diaphragm.

Because the fluid chamber 113 communicates with the fluid inlet 105 and the fluid inlet communicates with the fluid being monitored, the pressure within the fluid chamber 113 changes as the pressure of the monitored fluid changes. The diaphragm may move, deflect and/or deform as a result of the change in pressure within the fluid chamber 113. When the diaphragm moves, a variation in resistance of the piezoresistor may be induced. The electrode outputs 125, 135 may indicate to the control system 103 the change in resistance. The variation in resistance may be proportional to the applied pressure, and therefore, the applied pressure may be measured.

Figure 2A:
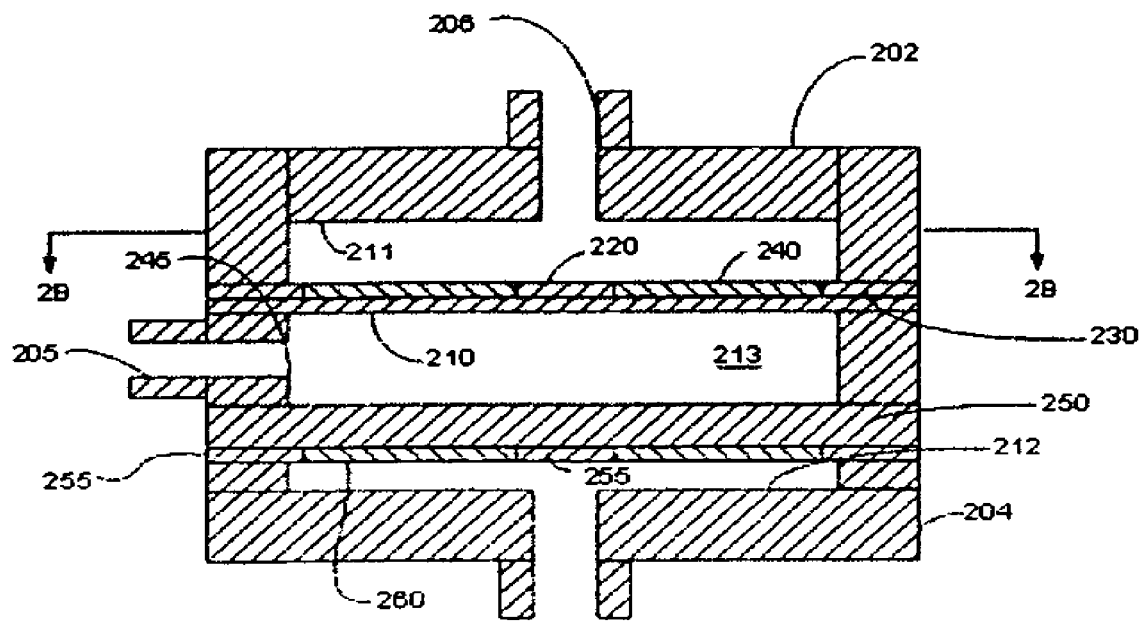
FIG. 2A illustrates a cross-sectional side view of a pressure sensor according to an example embodiment.
Figure 2B:
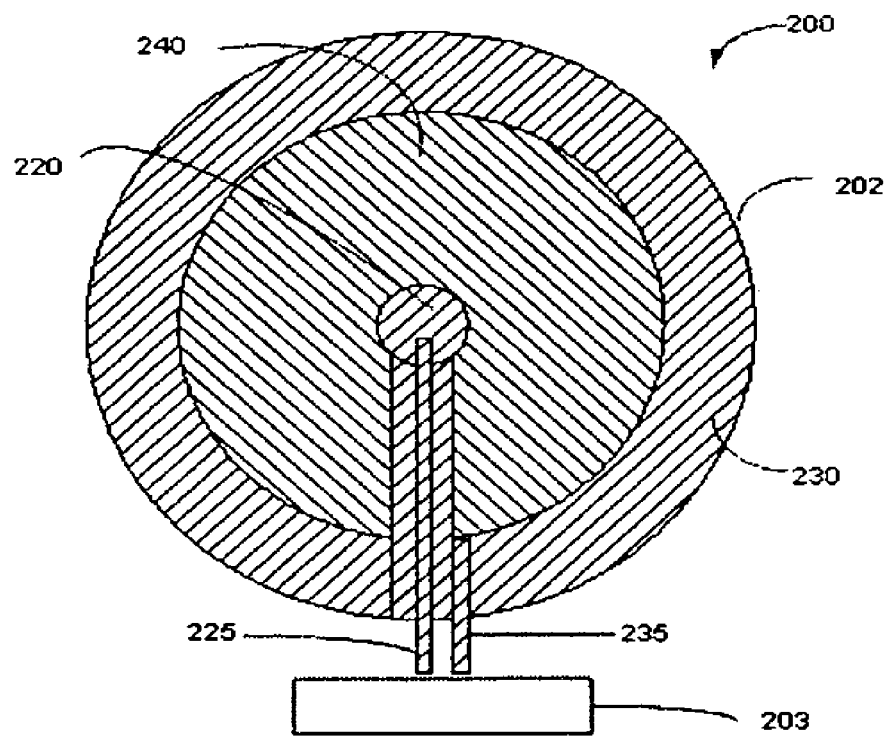
FIG. 2B illustrates a plan view of a diaphragm of the pressure sensor of FIG. 2A taken through 2B-2B.

FIGS. 2A and 2B respectively illustrate a cross-sectional side view and a plan view of a system 200 having a pressure sensor 202 and a control system 203 according to an example embodiment. The pressure sensor 202 includes a housing 204, a fluid inlet 205 of the housing, at least one vent 206 or fluid outlet port of the housing, and a diaphragm 210 within the housing 204. The pressure sensor 202 may use the diaphragm 210 to measure a pressure of a fluid introduced in the fluid inlet, as described in more detail below. Elements with like reference numerals of FIGS. 2A and 2B as compared with those of FIGS. 1A and 1B may have similar features and/or materials.

The housing 204 includes a first inner wall 211 and a second inner wall 212, which may be similar to the first inner wall 111 and the second inner wall 112 of FIG. 1A, respectively. The first inner wall 211 and the second inner wall 212 form a chamber 213. Within the chamber 213 is the diaphragm 210, which may be similar to the diaphragm 110. The diaphragm 210 includes electrodes 220, 230, and piezoresistive material forming at least one resistor 240 between the electrodes 220, 230. The electrodes and resistor may face the first inner wall 211. In an embodiment, the inlet 205 along an inner side wall 245 of the housing 204 may be oriented such that the flow of the entering fluid into the chamber 213 is parallel to a plane of the diaphragm 210. The first electrode 220 and the second electrode 230 may extend from the pressure sensor 202 as output connections 225, 235, respectively, to couple with the control system 203.

Additionally within the chamber 213 may be a substantially fixed portion 250 that may be substantially non-deflecting. The substantially fixed portion 250 may be substantially parallel to the diaphragm. The substantially fixed portion 250 includes a substantially fixed substrate extending across the chamber that may be substantially parallel to the diaphragm. The substantially fixed substrate includes a set of reference electrodes 255, and a reference resistor 260 between the set of reference electrodes. The set of reference electrodes 255 may correspond to the electrodes 220 and 230, and face the second wall 212. The inlet 205 is in fluid communication with a portion of the chamber 213 that is in between the diaphragm 210 and the substantially fixed portion 250 in this embodiment.

The reference resistor 260 may be a stationary resistor. The stationary resistor may include two or more resistors on the substantially fixed portion in an embodiment. In this embodiment, the resistor 240 may likewise include two or more resistors on the diaphragm in a pattern similar to reference resistor 260. In an embodiment where there are a first resistor and a second resistor on each of the diaphragm and the substantially fixed portion, the first resistors are disposed over a first half of the diaphragm and portion, respectively, and the second resistors are disposed over a second half of the diaphragm and portion, respectively.

The diaphragm 210 may deflect from a stored position to an active position upon applied pressure from the fluid inlet 205 and/or environmental conditions. However, the substantially fixed portion 250 does not substantially deflect due to applied pressure from the fluid inlet. The piezoresistor 260 of the substantially fixed portion 250 may also respond to the same environmental condition.

The stationary resistor may substantially decouple the response of the diaphragm 210 from a change in an environmental condition. Each resistor 240 and 260 may be subjected to the same environmental condition, such as temperature and humidity. Because the reference resistor 260 is associated with the substantially fixed portion 250, the response of the resistor 260 may be substantially exclusively due to the environmental condition. When there is a triggering environmental condition, a variation in resistance of the resistor 260 may be induced and detected by the control system 203. However, the response of the diaphragm resistor 240 may be due to the same triggering environmental condition and the applied pressure from the fluid inlet 205.

When the diaphragm 210 moves, a variation in resistance of the diaphragm resistor 240 may be induced and detected by the control system 203. The variation in resistance between the resistor 240 and the resistor 260 may be proportional to the applied pressure from inlet 205, and therefore, the applied pressure may be measured.

For example, if the pressure sensor 202 is introduced to a higher temperature, the housing 204 of the sensor 202 may expand, and the piezoresistance of the diaphragm and of the substantially fixed portion may change. If only measuring the diaphragm, a pressure change appears to have taken place. However, when the piezoresistor 260 on the non-deflecting part of the sensor 202 measures a resistance change, the control system may compensate for an environmental effect on the piezoresistor 240 and determine whether there is a pressure change. There may not be a pressure change if the change in resistance for each resistor 240 and 260 is substantially the same, in an embodiment. However, there may be a pressure change if the change in resistance for each resistor 240 and 260 is not substantially the same.

Figure 3A:
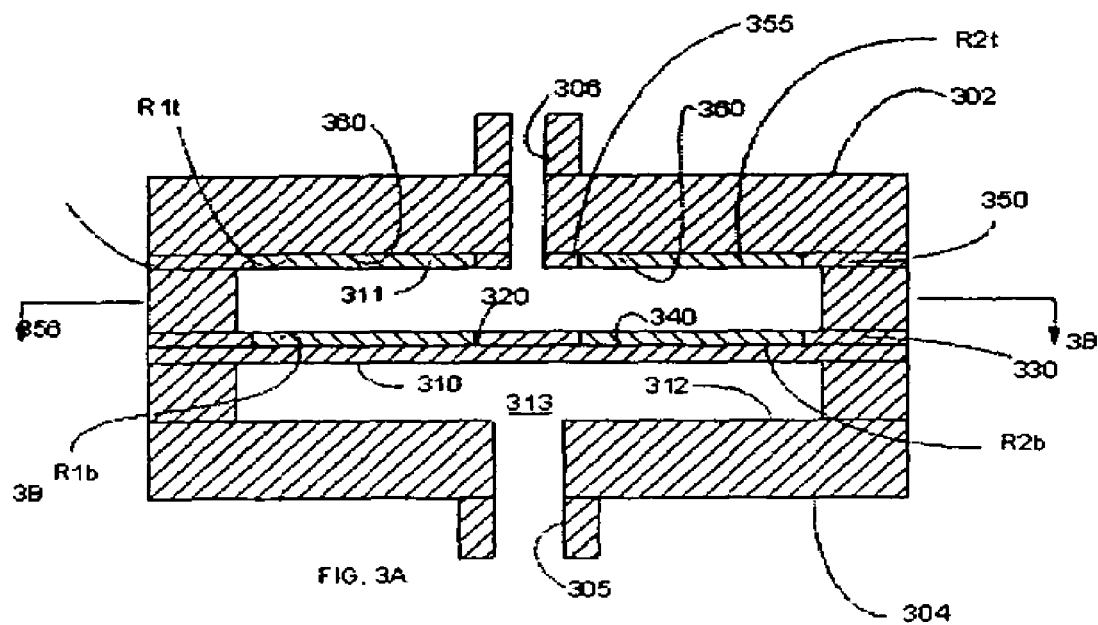
FIG. 3A illustrates a cross-sectional side view of a pressure sensor according to an example embodiment.
Figure 3B:
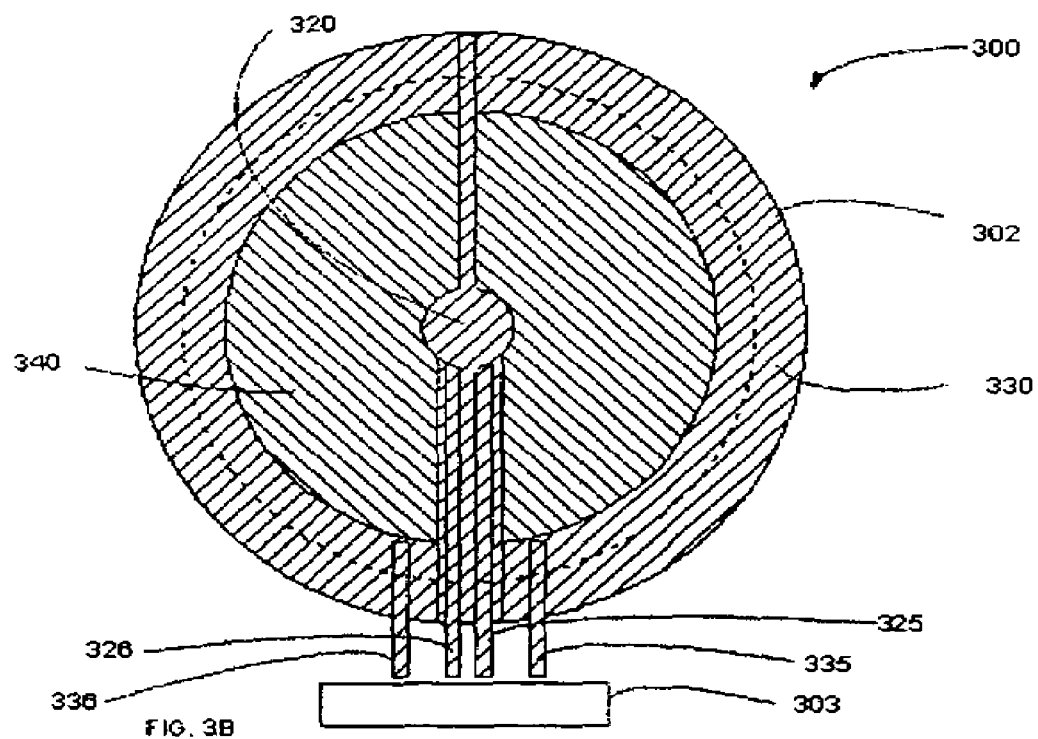
FIG. 3B illustrates a plan view of a diaphragm of the pressure sensor of FIG. 3A taken through 3B-3B.

FIGS. 3A and 3B respectively illustrate a cross-sectional side view and a plan view of a system 300 having a pressure sensor 302 and a control system 303 according to an example embodiment. The pressure sensor 302 includes a housing 304, a fluid inlet 305 of the housing, at least one vent 306 or fluid outlet port of the housing, and a diaphragm 310 within the housing 304. The pressure sensor 302 may use the diaphragm 310 to measure a pressure of a fluid introduced in the fluid inlet, as described in more detail below. Elements with like reference numerals of FIGS. 3A and 3B as compared with those of FIGS. 2A and 2B may have similar features, behaviors and/or materials.

The housing 304 includes a first inner wall 311 and a second inner wall 312, which may be similar to the first inner wall 111 and the second inner wall 112 of FIG. 1A, respectively. The first inner wall 311 and the second inner wall 312 form a chamber 313. Within the chamber 313 is the diaphragm 310 that may be similar to the diaphragm 110. The diaphragm may have electrodes 320, 330, and piezoresistive material forming at least one resistor 340 between the electrodes 320, 330. The electrodes 320, 330, and resistor 340 may face the first inner wall 311. In an embodiment, the inlet 305 along the second inner wall 312 of the housing 304 may be oriented such that the flow of the entering fluid is perpendicular to a plane of the diaphragm 310.

Disposed upon the first inner wall 311 may be a substantially stationary (or fixed) portion 350 that may be substantially non-deflecting. The substantially fixed portion 350 may be substantially parallel to the diaphragm. The substantially fixed portion 350 includes a substantially fixed substrate extending across the chamber. The substantially fixed substrate includes a set of reference electrodes 355, 356, and a reference resistor 360 between the set of reference electrodes. The first electrode 320, the second electrode 330, the first electrode 355, and the second electrode 356 may each extend from the pressure sensor 302 as output connections 325, 335, 326, 336, respectively, to couple with the control system 303.

The set of reference electrodes 355, 356 may correspond in location and/or material to the electrodes 320 and 330, respectively. The portion 350 may correspond to the portion 250 of FIGS. 2A and 2B. The reference resistor 360 may be a stationary resistor that behaves substantially similar to the stationary resistor 260.

In an embodiment, the resistor 340 includes a first resistor R1$b$ on the first half of the diaphragm 310, and a second resistor R2$b$ on the second half of the diaphragm 310. The resistor 360 includes a first resistor R1$t$ on a first half or side of the housing, and a second resistor R2$t$ on a second half or side of the housing. R1$t$ may correspond to R1$b$ and R2$t$ may correspond to R2$b$ in location on the respective element, material, thickness and behavior.

Figure 4A:
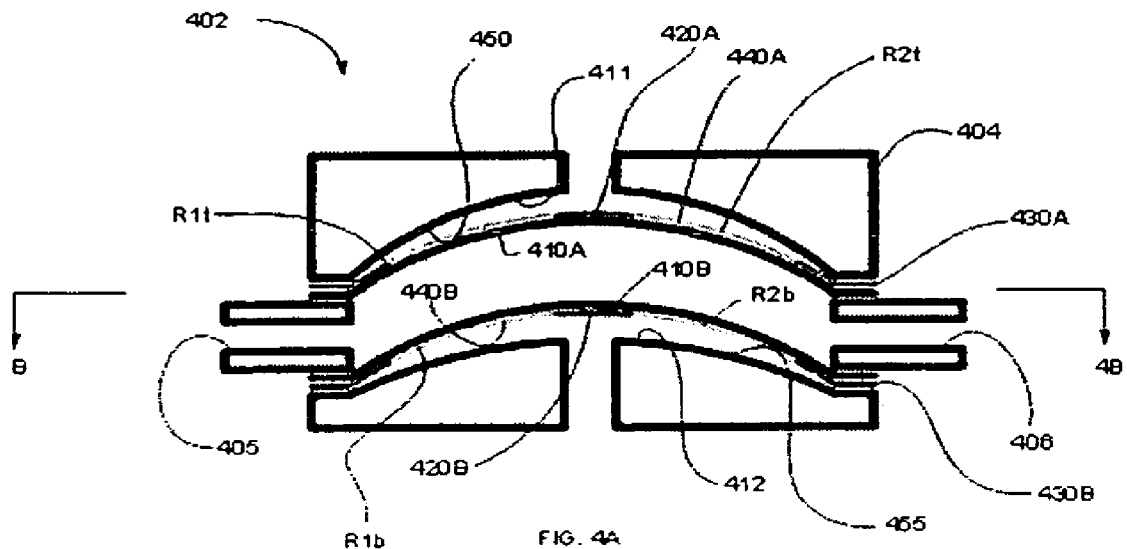
FIG. 4A illustrates a cross-sectional side view of a pressure sensor according to an example embodiment.
Figure 4B:
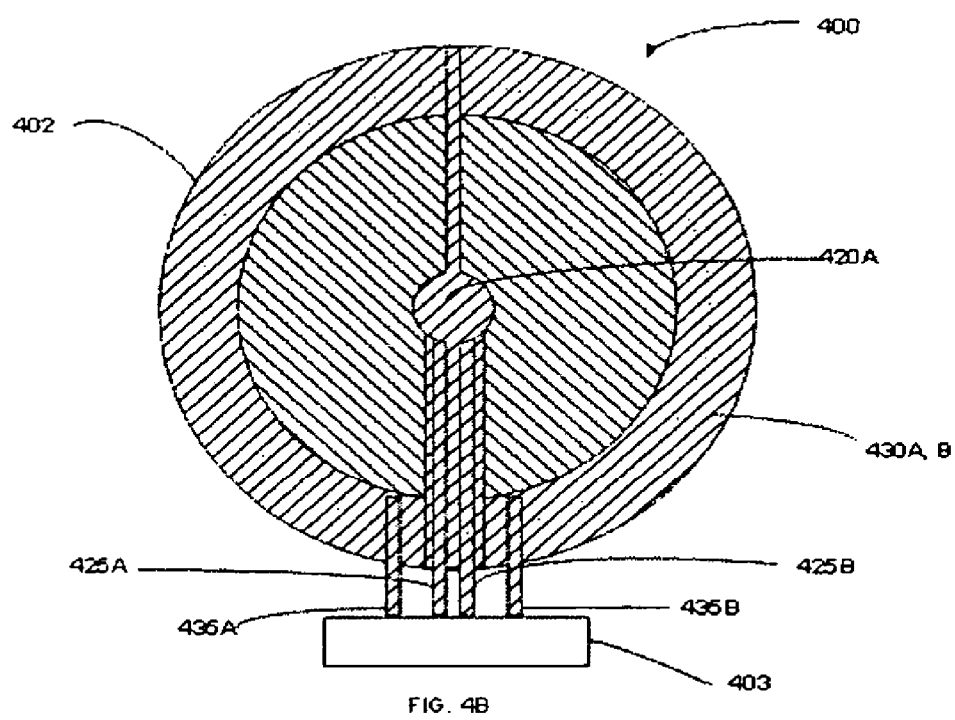
FIG. 4B illustrates a plan view of a diaphragm of the pressure sensor of FIG. 4A taken through 4B-4B.

FIGS. 4A and 4B respectively illustrate a cross-sectional side view and a plan view of a system 400 having a pressure sensor 402 and a control system 403 according to an example embodiment. The pressure sensor 402 includes a housing 404, a fluid inlet 405 of the housing, at least one vent 406 or fluid outlet port of the housing, and an element 410A within the housing 404. The pressure sensor 402 may use the element 410A to measure a pressure of a fluid introduced in the fluid inlet, as described in more detail below. Elements with like reference numerals of FIGS. 4A and 4B as compared with those of FIGS. 1A and 1B may have similar features, behaviors and/or materials.

The housing 404 includes a first inner wall 411 and a second inner wall 412, which may be similar to the first inner wall 111 and the second inner wall 112 of FIG. 1A, respectively. The first inner wall 411 and the second inner wall 412 form a chamber 413. Within the chamber 413 is the element 410A. The element 410A has electrodes 420A, 430A, and piezoresistive material forming at least one resistor 440A between the electrodes 420A, 430A. The element 410A faces the first inner wall 411. In an additional embodiment, within the chamber 413 may be an element 410B. The element 410B may have electrodes 420B, 430B, and piezoresistive material forming at least one resistor 440B between the electrodes 420B, 430B. The resistor 440B, and the electrodes 420B, 430B may be on the side of the element 410B that faces the second inner wall 412.

In an embodiment, the inlet 405 of the housing 404 may be oriented such that the flow of the entering fluid is parallel to a plane of the element 410A and/or 410B. In an embodiment, the inlet 405 of the housing 404 may be oriented such that the fluid inlet is fluidically coupled with the portion of the chamber 413 that is between the element 410A and the element 410B. The first electrode 420A, the second electrode 430A, the first electrode 420B, and the second electrode 430B may each extend from the pressure sensor 402 as output connections 425A, 435A, 425B, 435B, respectively, to couple with the control system 403.

The elements 410A, 410B may be a polymer element. The elements 410A, 410B may be a pre-formed plastic part. The elements 410A, 410B may be substantially rigid in a stored position. One or both of the elements 410A, 410B may be curved in a stored position. At least one of the first and second elements 410A, 410B may deflect from a stored position to an active position upon applied pressure into the fluid inlet.

The first and second elements 410A, 410B may deflect in opposite directions in response to applied pressure into the fluid inlet. The piezoresistance of the elements 410A, 410B may be indirectly proportional, in that when one increases the other may decrease. The first element 410A may move up and the resistance of the first element 410A may increase proportionally. At about the same time, the second element 410B may move down and the resistance of the second element 410B may decrease proportionally.

The housing 404 may include a first stopper 450 associated with the element 410A and a second stopper 455 associated with the element 410B. The first stopper 450 may include the surface area of the inner wall 411, and the second stopper 455 may include the surface area of the inner wall 412. In an embodiment, a means for protecting the pressure sensor device from being damaged includes substantially protecting at least one of the element 410A and element 410B using at least one of the first stopper 450 and the second stopper 455. The top and bottom stoppers may protect the device against accidental very high pressure that may destroy the device and/or push the two elements over their respective elastic limits of the material, thereby inducing a permanent deformation.

In an embodiment, the resistor 440A of the element 410A includes a first resistor R1$t$ on a first half of the element 410A, and a second resistor R2$t$ on a second half of the element 410A. In an embodiment, the resistor 440B of the element 410B includes a first resistor R1$b$ on a first half of the element 410B, and a second resistor R2$b$ on a second half of the element 410B. R1$t$ may correspond to R1$b$ and R2$t$ may correspond to R2$b$ in location on the respective element, material, thickness and behavior.

Figure 5:
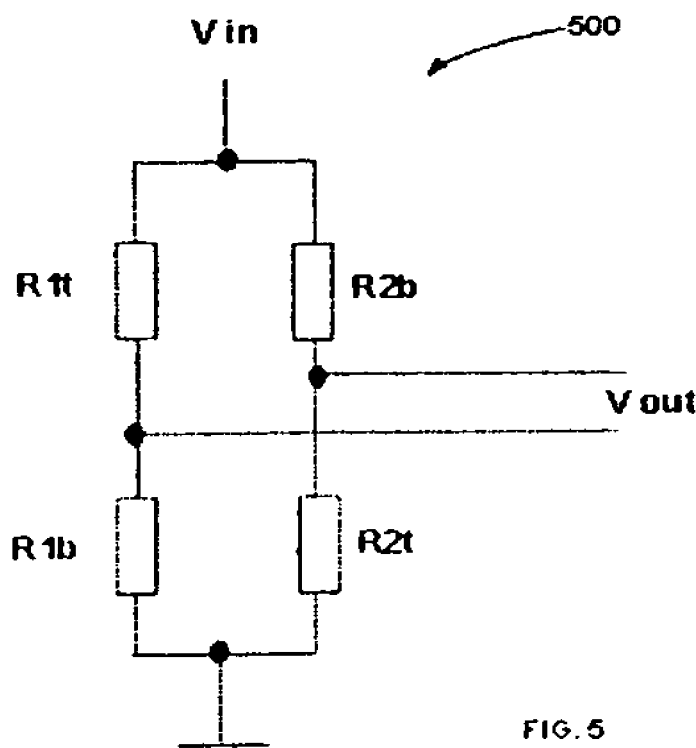
FIG. 5 illustrates a bridge configuration of an example pressure sensor.

FIG. 5 illustrates a bridge configuration 500 of an example pressure sensor according to an embodiment. Wheatstone bridge designs may use strain-sensitive resistors strategically placed on a diaphragm, such that the resistance increases proportionally to the strain change. The bridge configuration may apply to the embodiments of FIGS. 3A, 3B and/or FIGS. 4A, 4B. The resistors R1$t$, R1$b$, R2$b$, and R2$t$ may be arranged into a fully active bridge with two increasing and two decreasing in resistance, as shown.

Piezoresistive bridges may produce over sixty times more signal than foil gauges for the same applied pressure. In the illustrated embodiments, sensitivity and linearity may be maximized. The illustrated bridge configuration may be used for dynamic flow pressure applications for both fluid inlet and fluid outlet. The embodiment illustrated in FIG. 5 can be serially introduced into the fluid stream, measuring the dynamic evolution of the process.

Figure 6:
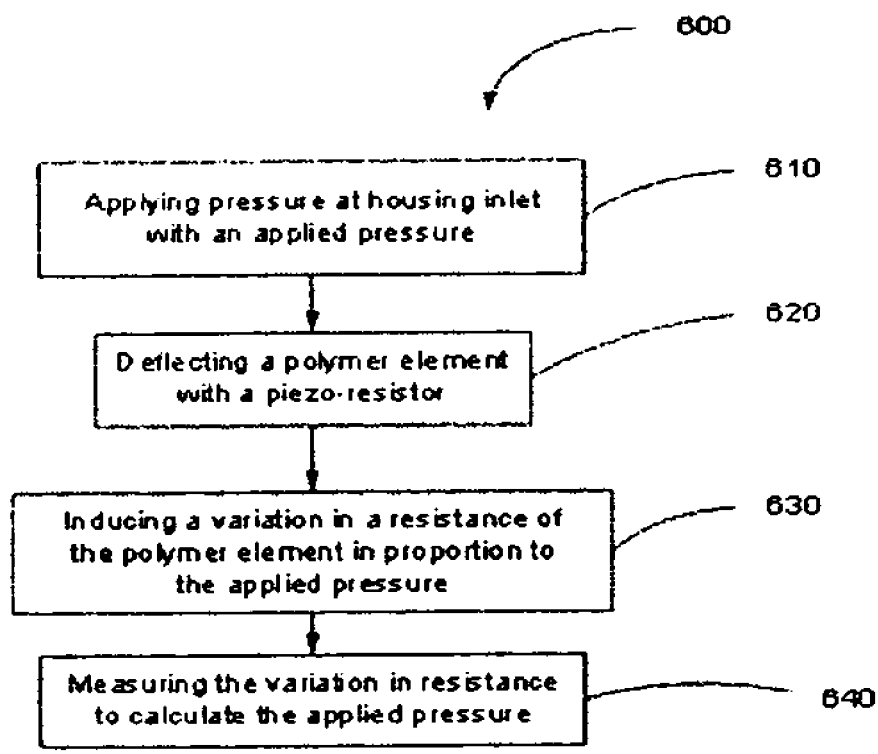
FIG. 6 illustrates a process to calculate an applied pressure according to an example embodiment.

FIG. 6 illustrates a process 600 to calculate an applied pressure according to an example embodiment.

At block 610, pressure is applied at the housing inlet 105 with a fluid pressure.

At block 620, a polymer element having a piezoresistor is deflected. The polymer element may be a polymer diaphragm and/or may be a pre-formed plastic part.

At block 630, a variation in a resistance of the polymer portion is induced, in proportion to the applied pressure.

At block 640, the variation in resistance is measured to calculate the applied pressure. Measuring the variation in resistance may include measuring a voltage difference between electrodes associated with the polymer element.

Each of the FIGS. 1A, 2A, 3A, and 4A illustrate at least one fluid inlet and at least one vent. The devices of the illustrated embodiments may be used in vacuum applications and/or in pressure differential applications using the vents as reference inlets.

One skilled in the art will recognize that other configurations are available and other methods of manufacture may function as well without exceeding the scope of the disclosed subject matter.

While particular embodiments have been illustrated and described, they are merely examples and a person skilled in the art may make variations and modifications to the embodiments described herein without departing from the spirit and scope of the presently disclosed subject matter.

The invention claimed is:

1. A pressure sensor comprising:
a housing portion with a fluid inlet coupled with a chamber, wherein fluid introduced in the fluid inlet enters the chamber; and
a polymer substrate within the chamber of the housing portion and coated with piezoresistive material, wherein the piezoresistive material coated on the polymer substrate forms a first resistor, wherein the polymer substrate includes a first resistance value that changes to a second resistance value in a response to a predetermined condition.

2. The pressure sensor of claim 1 wherein the predetermined condition includes the polymer substrate under applied pressure to deflect.

3. The pressure sensor of claim 1 wherein the polymer substrate includes a central region, an edge region, a first electrode over the central region, and a second electrode over the edge region.

4. The pressure sensor of claim 3 wherein the piezoresistive material is deposited between the central region and the edge region.

5. The pressure sensor of claim 3 wherein the piezoresistive material is deposited in a spiral pattern between the central region and the edge region.

6. The pressure sensor of claim 1 wherein the polymer substrate is on a plane that is perpendicular to the fluid inlet.

7. The pressure sensor of claim 1 wherein the predetermined condition includes a change in an environmental condition.

8. The pressure sensor of claim 2 wherein the substrate deflects at an applied pressure through the fluid inlet.

9. The pressure sensor of claim 1 wherein the first resistor includes two or more resistors.

10. The pressure sensor of claim 1 wherein the housing portion includes a stationary resistor formed of piezoresistive material.

11. The pressure sensor of claim 10 wherein the stationary resistor includes two or more resistors.

12. The pressure sensor of claim 10 wherein the stationary resistor is a reference resistor to substantially decouple the response of the polymer substrate from a change in an environmental condition.

13. A pressure sensor comprising:
a housing with a fluid inlet fluidically coupled with a chamber;

a first polymer element within the housing having a first resistor formed of piezoresistive material and at least one electrode; and a second polymer element within the housing having a second resistor formed of piezoresistive material and at least one electrode.

14. The pressure sensor of claim 13 wherein the first polymer element is curved in a stored position, and wherein the second polymer element is curved in a stored position.

15. The pressure sensor of claim 13 wherein the chamber is between the first polymer element and the second polymer element.

16. The pressure sensor of claim 13 wherein at least one of the first and second polymer elements deflects from a stored position to an active position upon applied pressure into the fluid inlet.

17. The pressure sensor of claim 13 wherein the first and second polymer elements deflect in opposite directions in response to applied pressure into the fluid inlet.

18. The pressure sensor of claim 13 wherein the housing includes a first stopper associated with the first polymer element and a second stopper associated with the second polymer element.

19. The pressure sensor of claim 13 wherein the first polymer element has a first side and a second opposite side that faces the chamber, wherein the second polymer element has a first side and a second opposite side that faces the chamber, wherein the first resistor is on the first side of the first polymer element, and the second resistor is on the first side of the second polymer element.

20. The pressure sensor of claim 19 further comprising means for protecting the pressure sensor device from being damaged.

21. The pressure sensor of claim 20 wherein the housing includes at least one stopper adjacent at least one of the first side of the first polymer element and the first side of the second polymer element, wherein the means for protecting includes the at least one stopper.

22. The pressure sensor of claim 13 wherein the pressure sensor is used in a vacuum application.

23. The pressure sensor of claim 13 wherein the housing includes a vent.

24. A process comprising:

applying pressure at a fluid inlet, the fluid inlet coupled with a chamber of a housing and wherein fluid introduced in the fluid inlet enters the chamber;

deflecting a polymer element having a piezoresistor, a first electrode and a second electrode deposited thereon, the polymer element within the chamber; and measuring a variation in resistance of the piezoresistor to calculate the applied pressure, wherein the variation in resistance is directly or indirectly proportional to the applied pressure.

25. The process of claim 24 wherein the polymer element includes a diaphragm.

26. The process of claim 24 wherein the polymer element includes a curved pre-formed element.

27. The process of claim 24 wherein measuring the variation in resistance includes measuring a voltage difference between the first and second electrodes.

* * * * *